United States Patent
Near et al.

(10) Patent No.: US 7,183,518 B2
(45) Date of Patent: Feb. 27, 2007

(54) SYSTEM OF FOOD STORAGE PREPARATION AND DELIVERY IN FINISHED COOKED STATE

(76) Inventors: Michael Near, 1002 Riverside Dr., Unit 32, Burbank, CA (US) 91506-3254; Nancy Rae Funk, 1002 Riverside Dr., Unit 32, Burbank, CA (US) 91506-3254

( * ) Notice: Subject to any disclaimer, the term of this patent is extended or adjusted under 35 U.S.C. 154(b) by 0 days.

(21) Appl. No.: 11/234,390

(22) Filed: Sep. 26, 2005

(65) Prior Publication Data
US 2006/0191885 A1     Aug. 31, 2006

Related U.S. Application Data

(60) Provisional application No. 60/612,612, filed on Sep. 24, 2004.

(51) Int. Cl.
*H05B 3/00* (2006.01)
*H05B 1/00* (2006.01)
*H05B 11/00* (2006.01)

(52) U.S. Cl. ............... 219/214; 219/501; 219/506; 219/486; 705/7

(58) Field of Classification Search ............... 219/214, 219/501, 506, 486, 679; 705/7, 26, 10; 706/52
See application file for complete search history.

(56) References Cited

U.S. PATENT DOCUMENTS

| | | | |
|---|---|---|---|
| 4,919,477 A * | 4/1990 | Bingham et al. ........ 296/24.36 |
| 5,285,604 A * | 2/1994 | Carlin ................... 52/79.1 |
| 5,522,310 A | 6/1996 | Black |
| 5,535,664 A | 7/1996 | Rokowski |
| 5,655,595 A | 8/1997 | Westbrooks, Jr. |
| 5,688,423 A * | 11/1997 | Rudewicz et al. ......... 219/501 |
| 5,797,445 A | 8/1998 | Westbrooks, Jr. et al. |
| 5,997,924 A * | 12/1999 | Olander et al. ............ 426/296 |
| 6,080,972 A | 6/2000 | May |
| 6,236,974 B1 * | 5/2001 | Kolawa et al. ............... 705/7 |
| 6,244,165 B1 | 6/2001 | Trombley et al. |
| 6,249,710 B1 | 6/2001 | Drucker et al. |
| 6,431,628 B1 * | 8/2002 | Bell, Jr. ................... 296/24.32 |
| 6,444,965 B1 | 9/2002 | Ha et al. |
| 6,483,695 B1 | 11/2002 | Hartstein |
| 6,549,818 B1 | 4/2003 | Ali |
| 6,550,681 B1 | 4/2003 | Ross et al. |
| 6,557,756 B1 | 5/2003 | Smith |
| 6,646,659 B1 | 11/2003 | Brown et al. |

(Continued)

FOREIGN PATENT DOCUMENTS

EP        0335698        10/1989

(Continued)

*Primary Examiner*—Robin Evans
*Assistant Examiner*—Vinod Patel
(74) *Attorney, Agent, or Firm*—Richard C. Litman (57) ABSTRACT

A system configured to provide food storage, preparation, and delivery in a finished cooked state includes a computer control interface, a freezer/refrigeration module, a food transport mechanism, a heating/cooking module, and a delivery area. The meal system is configured to provide food storage, preparation, and delivery in a finished cooked state. The system may be configured in the form of an independent unit or in the form of a combination of separate modules. The computer control interface, freezer/refrigeration module, food transport mechanism, heating/cooking module, and delivery area may be communicatively interconnected wirelessly or non-wirelessly.

5 Claims, 4 Drawing Sheets

U.S. PATENT DOCUMENTS

| | | |
|---|---|---|
| 6,665,384 B2 | 12/2003 | Daum et al. |
| 6,681,137 B1 | 1/2004 | Drucker et al. |
| 6,690,979 B1 | 2/2004 | Smith |
| 6,730,890 B2 | 5/2004 | Kish et al. |
| 6,919,815 B2 * | 7/2005 | Peterson ................ 340/815.4 |
| 6,930,296 B2 * | 8/2005 | Chen ......................... 219/700 |
| 7,025,121 B2 * | 4/2006 | Whitehead et al. ........... 165/42 |
| 7,026,929 B1 * | 4/2006 | Wallace ................ 340/539.13 |
| 2002/0026325 A1 | 2/2002 | Hirahara et al. |
| 2002/0082924 A1 | 6/2002 | Koether |
| 2002/0171674 A1 | 11/2002 | Paris |
| 2002/0178066 A1 | 11/2002 | Roh et al. |
| 2002/0189462 A1 | 12/2002 | Guess |
| 2003/0139843 A1 | 7/2003 | Hu et al. |
| 2003/0141295 A1 | 7/2003 | Ishikawa et al. |

FOREIGN PATENT DOCUMENTS

| | | |
|---|---|---|
| EP | 0455477 | 11/1991 |
| JP | 2002-92120 | 3/2002 |
| JP | 2002-236798 | 8/2002 |
| JP | 2003-256647 | 9/2003 |
| WO | WO 03/038652 | 5/2003 |

* cited by examiner

SYSTEM OF FOOD STORAGE PREPARATION AND DELIVERY IN FINISHED COOKED STATE

CROSS-REFERENCE TO RELATED APPLICATION

This application claims the benefit of U.S. Provisional Patent Application Ser. No. 60/612,612, filed Sep. 24, 2004.

BACKGROUND OF THE INVENTION

1. Field of the Invention

The present invention generally relates to computerized cooking and, more particularly to a system of food storage, preparation, and delivery in a finished cooked state.

2. Description of the Related Art

Meal preparation for homeowners, small businesses, and other organizations involves planning and management, and normally results in expeditures of significant amounts of time. For example, homeowners and/or operators of small restaurants, jails, nursing homes, etc., typically make food purchases, store food, cook food, and provide the completed meals to the various participants. Advancements in computer technology and the never ending desire to reduce and/or eliminate the time involved in completing typical daily activities, has resulted in the need for a system to completely prepare and deliver pre-packaged foods as complete meals without any labor on the part of the operator or user.

Such a system would prove to be extremely convenient in terms of reduced shopping, elimination of preparation time, and tracking of the aging of foods held in the system in order to reduce the instance of waste/spoilage.

The related art is represented by the following references of interest.

U.S. Patent Application Publication No. US 2002/0026325 A1, published Feb. 28, 2002 for Morio Hirahara et al., describes a food management and processing system which can reduce an amount of input operation performed by the user in obtainment of data about food storage and food processing, and can collectively manage food up to a final consumption stage. U.S. Patent Application Publication No. US 2002/0082924 A1, published Jun. 27, 2002 for Bernard G. Koether, describes a bi-directional communication network which provides monitoring, data collection, and control of food service industry operations. U.S. Patent Application Publication No. US 2002/0171674 A1, published Nov. 21, 2002 for Harry G. Paris, describes a system and method for providing food-related information, including recipes, methods, hints, and cooking instructions to a user via an interactive computer at a food-related location, such as a kitchen.

U.S. Patent Application Publication No. US 2002/178066 A1, published Nov. 28, 2002 for Young H. Roh et al., describes a refrigerator capable of transmitting and receiving information over a network and having an automatic food ordering function and a method for operating the same. U.S. Patent Application Publication No. US 2002/0189462 A1, published Dec. 19, 2002 for William Y. Guess, describes an automatic cooking monitor, device, system and method which operate in accordance with the thermal equalization of a heated comestible. U.S. Patent Application Publication No. US 2003/0139843 A1, published Jul. 24, 2003 for Ziqiang Hu et al., describes an automated cooking system that cooks food accompanied by machine-readable indicia, such as a bar code reader read by a reader. U.S. Patent Application Publication No. US 2003/0141295 A1, published Jul. 31, 2003 for Kazuhiko Ishikawa et al., describes a microwave oven system and a microwave oven operating based on information received through a communication network.

U.S. Pat. No. 5,522,310, issued Jun. 4, 1996 to Gary W. Black, Sr. et al., describes a vending machine for automatically dispensing heated and/or cooked food products that is fully self-contained, and capable of effective stand-alone operation. U.S. Pat. No. 5,535,664, issued Jul. 16, 1996 to Paul Rokowski, describes a remote control cooking apparatus with stackable cookers that cooks a variety of foods at a set temperature, and is activated by a signal transmitted through the user's telephone to a receiver on the apparatus. U.S. Pat. No. 5,655,595, issued Aug. 12, 1997 to John W. Westbrooks, Jr., and 5,797,445, issued Aug. 25, 1998, to John W. Westbrooks, Jr. et al., describe an integrated refrigeration and rethermalization system for storage of prepared meals in a refrigerated state, rethermalization of the meals in accordance with a rethermalization program, and maintenance of the rethermalized meals at a desired serving temperature.

U.S. Pat. No. 6,080,972, issued Jun. 27, 2000 to Leonhard May, describes a remotely operated universal programmable oven controller. U.S. Pat. No. 6,244,165 B1, issued Jun. 12, 2001 to Joseph S. Trombley et al., describes an integrated cooling and heating food preparation system which can keep food cool in a certain volume and heat it up in the same volume. U.S. Pat. No. 6,249,710 B1, issued Jun. 19, 2001 to Steven J. Drucker et al., describes an interpretive BIOS machine for controlling the cooking of food or performance of a chemical, physical, or thermodynamic process in any of a plethora of variously sized host microwave ovens or disparate process streams in response to a predetermined code.

U.S. Pat. No. 6,381,614 B1, issued Apr. 30, 2002 to Jeffrey R. Barnett et al., describes a recipe database that integrates menus for food preparation of multiple dishes based on skill level. U.S. Pat. No. 6,444,965 B1, issued Sep. 3, 2002 to Jae-Ki Ha et al., describes a microwave oven and a controlling method therefore that employs a data receiving station connected to an external device which is connectable to the Internet to receive cooking data from the external device, and a driving section for performing the cooking operation by using by using the cooking data received from the Internet. U.S. Pat. No. 6,483,695 B1, issued Nov. 19, 2002 to Stanley Harstein, describes a refrigerator-based, computer task controller and a corresponding method.

U.S. Pat. No. 6,549,818 B1, issued Apr. 15, 2003 to Mohamed A. Ali, describes a cooking appliance that includes a food-heating unit having a computer-controlled temperature controller and an Internet-accessing appliance computer having a computer program. U.S. Pat. No. 6,550,681 B1, issued Apr. 22, 2003 to John A. F. Ross et al., describes a cooking apparatus with a scanning device for reading a tag disposed on a cooking item that includes cooking instructions, and a network connection for receiving updated information relative to a respective cooking item. U.S. Pat. No. 6,557,756 B1, issued May 6, 2003 to Graeme Smith, describes a domestic appliance adapted for interaction with a communications network by the addition of a substantially self-contained discrete communications module connectable to the communications network, the communications module including display means and command entry means that optionally interact with the appliance.

U.S. Pat. No. 6,649,659 B1, issued Nov. 11, 2003 to Michael W. Brown et al., describes a method, system, and program for specifying an electronic food menu with food preferences from a universally accessible database. U.S. Pat. No. 6,665,384 B1, issued Dec. 16, 2003 to Wolfgang Daum et al., describes a method for changing a control program that controls at least some operations of an appliance. U.S. Pat. No. 6,681,137 B1, issued Jan. 20, 2004 to Steven J. Drucker et al., describes an interpretative system architecture for a seamless transfer of energy to a physical, chemical, or thermodynamic process stream, or microwave oven.

U.S. Pat. No. 6,690,979 B1, issued Feb. 10, 2004 to Robert M. Smith, describes a method of controlling an intelligent appliance network that allows a user to select a desired instruction sequence to be executed by a remote appliance. U.S. Pat. No. 6,730,890 B2, issued May 4, 2004 to Barbara A. Kish et al., describes a programmable remote controlled apparatus and method for controlling the time and temperature of a cooking or a baking cycle.

European Patent Application Publication No. 0 335 698 A2, published Oct. 4, 1989, describes a fully automated robotized system and method for cooking food products. European Patent Application Publication No. 0 455 477 A2, published Nov. 6, 1991, describes an automated food cooking system for use in a quick service or fast food restaurant. Japan Patent Application Publication No. 2002-92120, published Mar. 29, 2002, describes a cooking menu information provision system, a cooking menu information providing device, and a cooking menu information distributing device. Japan Patent Application Publication No. 2002-236798, published Aug. 23, 2002, describes a device and method for managing food in a refrigerator.

World Intellectual Property Organization (WIPO) Patent Application Publication No. WO 03/038652 A1, published May 8, 2003, describes an intelligent breadmaker appliance which receives a plurality of program recipes from a network that are executed by scanning with a scanner a symbol and associating the scanned symbol with one of the plurality of program recipes while keeping a real-time clock synchronized and correctly set by receiving period time synchronization messages. Japan Patent Application Publication No. 2003-256647, published Sep. 12, 2003, describes a recipe-animation associating device and a recipe-animation association associating program.

None of the above inventions and patents, taken either singly or in combination, is seen to describe the instant invention as claimed. Thus a system of food storage, preparation, and delivery, in a finished cooked state solving the aforementioned problems is desired.

SUMMARY OF THE INVENTION

The present invention is a system of food storage, preparation, and delivery in a finished cooked state. The meal system includes a computer control interface, a freezer/refrigeration module, a food transport mechanism, a heating/cooking module, and a delivery area. The meal system is configured to provide food storage, preparation, and delivery in a finished cooked state. The meal system may be configured in the form of an independent unit or in the form of a combination of separate modules. The computer control interface, freezer/refrigeration module, food transport mechanism, heating/cooking module, and delivery area may be communicatively interconnected wirelessly or non-wirelessly.

The computer control interface includes a display, one or more central processors, meal system software with a graphical user interface (GUI), one or more memories, and one or more power sources. The computer control interface may also include a modem, one or more input/output connectors, one or more input/output switches, and an antenna. A communication bus communicatively interconnects wirelessly or non-wirelessly to the components included in the meal system. The meal system is configured to provide food storage, preparation, and delivery in a finished cooked state.

The computer control interface monitors and tracks the frequency and usage of particular meal packages used through movement and operation of the transport mechanism. Therefore, when the meal system needs to be filled up or stored with new meal packages, the service provider is provided with information regarding particular meal packages to provide. The user may also provide input via the activity screens to modify and/or request particular types and/or quantities of food packages.

The freezer/refrigeration module includes a compartment configured to store in a frozen and/or refrigerated state one or more meal packages. The compartment may be segmented into one or more sections, and each section may include plural shelves, cells, or holding units configured to receive a meal package. The transport mechanism includes a meal package transport assembly and a vertically movable guide rail. The transport assembly moves along the guide rail, and the guide rail adjustably moves to a position according to positional commands received from the computer control interface after receiving a selection order from a user. The transport assembly includes one or more controllable mechanical grasping devices to reach out and secure a meal package from a particular location. The heating/cooking module may be configured to heat items using microwave, infrared, convection, or any combination thereof.

The delivery area is configured as a presentable and clean area that may be attractive in appearance where a cooked meal package(s) may be retrieved by a user. The computer control interface, freezer/refrigeration module, food transport mechanism, heating/cooking module, and delivery area are all made of appropriate durable material for their associated tasks. The delivery area may equipped with lights and can interconnect to a power line to provide power to all components of the mechanism.

The meal system software includes code for accessing control database information that stores various parameters regarding the meal system. The parameters may include an inventory listing, cooking instructions, food packages that are available to feed predetermined numbers of people, the current quantity of particular food packages, expiration dates for particular food packages, the frequency of use of particular food packages, etc. The meal system software may suggest wines, alternate dishes, foods that need to be consumed before a set expiration date, a category listing for meats, fish, oriental, pasta, etc.

Accordingly, it is a principal aspect of the invention to provide a system configured to provide food storage, preparation, and delivery in a finished cooked state. The system includes a computer control interface, a freezer/refrigeration module, a food transport mechanism, a heating/cooking module, and a delivery area.

It is an aspect of the invention to provide improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a system of food storage, preparation, and delivery in a finished cooked state. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, the system of food storage, preparation, and delivery in a finished cooked state, referred to herein as the "meal system" 10, includes a computer control interface 12, a freezer/refrigeration module 14, a food transport mechanism 16, a heating/cooking module 18, and a delivery area 20. The meal system 10 may be configured in the form of an independent unit or as a combination of separate modules or components communicatively interconnected wirelessly or non-wirelessly to one another. The meal system 10 may also be operably interconnected with or integrated in known storage, cooling, and/or heating products.

The computer control interface 12 includes a display, one or more central processors, meal system software with a graphical user interface (GUI), one or more memories, and one or more power sources. The meal system 10 may also include a modem, one or more input/output connectors, one or more input/output switches, and an antenna. A communication bus communicatively interconnects wirelessly or non-wirelessly to one another the components included in the meal system 10. The meal system 10 is configured to provide food storage, preparation, and delivery in a finished cooked state.

Figure 1:
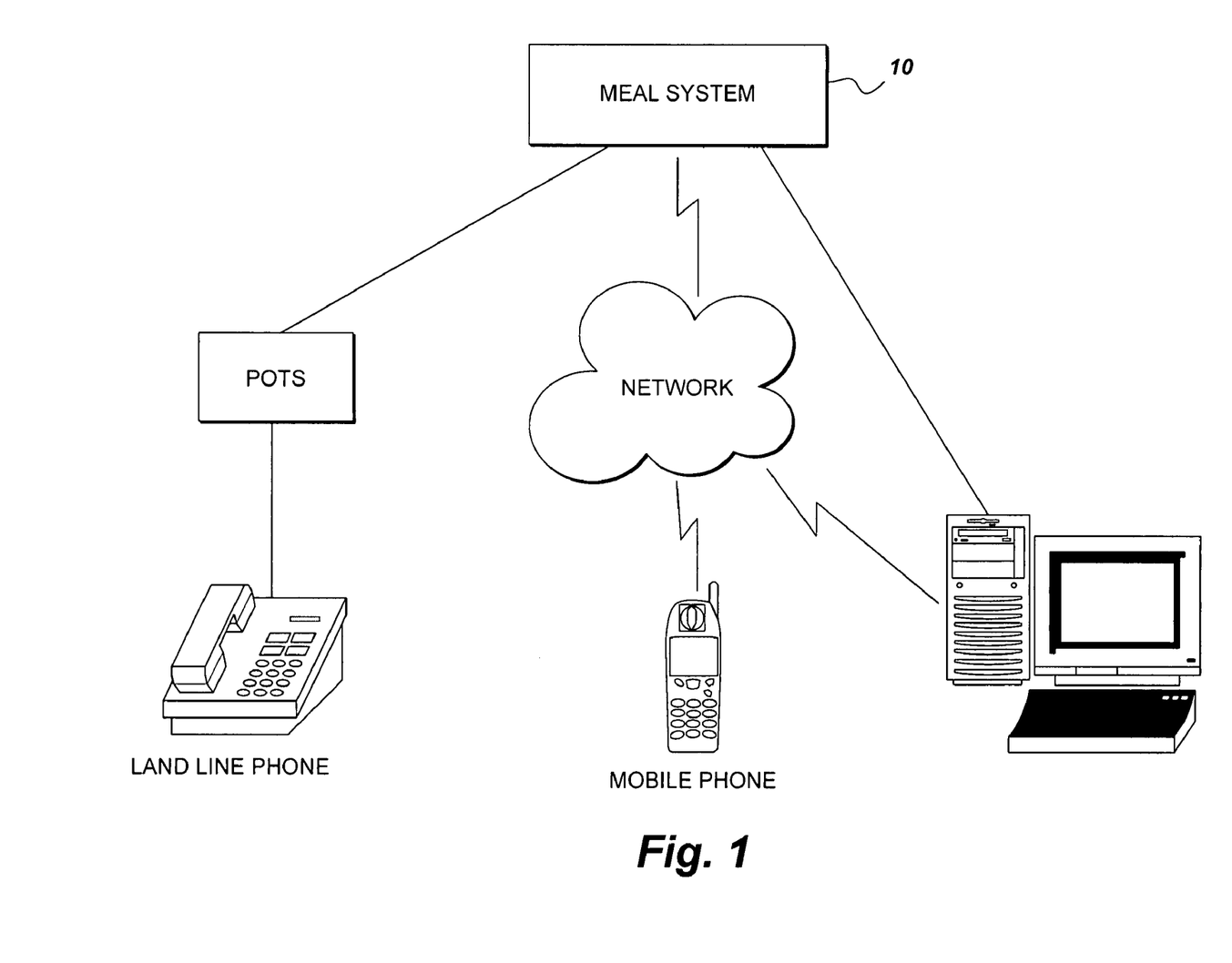
FIG. 1 is a diagram of a system of food storage preparation and delivery in a finished cooked state wirelessly or non-wirelessly interconnected with remote input/output devices according to the present invention.
Figure 2:
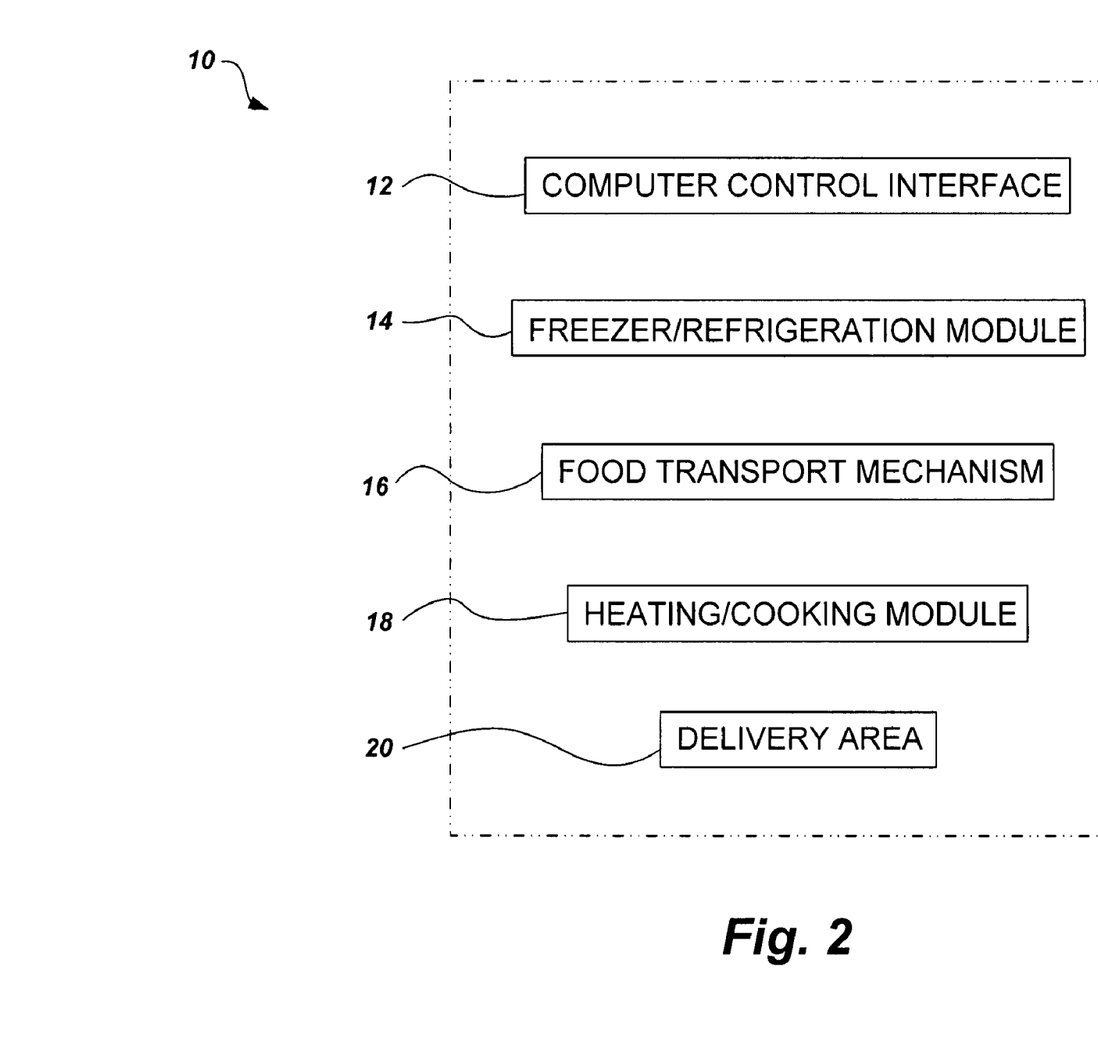
FIG. 2 is block diagram of a system of food storage preparation and delivery in a finished cooked state according to the present invention.

The computer control interface 12 may be wirelessly or non-wirelessly interconnected with remote input/output devices (e.g. remote control devices) via the public telephone lines or any known technique (e.g., wireless local area network (LAN), IrDA, Bluetooth, FireWire, etc.), or through a network system via any number of switches, such as a LAN, a wide area network (WAN), an intranet, an extranet, the Internet, etc., to enable a user to wirelessly or non-wirelessly remotely control the system through appropriate control signals. The computer control interface 12 can include a phone jack for connection to a phone line.

The meal system software and GUI may be stored in the memory(s), as well as on a data communications device, such as the modem, connected to the bus for wirelessly and/or non-wirelessly connecting the system to a LAN, a WAN, an intranet, an extranet, the Internet, etc. The meal system software and GUI are stored in the memory(s) and execute under the direction of the processor(s).

The computer control interface 12 utilizes one or more computer useable memories operably configured for use with the processor(s). The memory(s) are configured in the form of a computer useable medium(s). As used herein, a "computer useable medium" includes a non-volatile medium, a volatile medium, and/or an installation medium.

The display may be any type of display, such as a liquid crystal display, a light emitting diode display, a plasma display, a cathode ray tube display, etc. The display may also be configured to effect touch screen commands to enable a user to scroll through activity screens and order food items via entering touchscreen commands. The computer control interface 12 can interconnect to a power line to provide power to all components of the interface 12. A back-up power source, such as a chargeable or non-chargeable battery, may be included to provide power in case of a main power loss or outage.

The meal system 10 is preferably configured to be maintained by a service provider who maintains the storage of an adequate supply of meal packages for use by the user. Meal packages, as used herein, refer to self contained packages of food material, where each package may be divided into plural sections, and the sections may be provided with any combination of meat, vegetables, starch, fish, soup, etc. The meal packages may be configured for freezing and/or refrigerating. For example, there may be meal packages with food items intended to be frozen, similar to TV dinner configurations or the like, and there may be meal packages with food items intended to be refrigerated, such as salads or the like. The meal packages may be configured in a variety of standardized dimensions (e.g., three or more size ranges) according to the desires of the user and/or service provider. The meal packages are provided with a bar code label or other coding device to enable the meal packages to be scanned and identified for inventory purposes.

The computer control interface 12 monitors and tracks the frequency and usage of particular meal packages used through movement and operation of the transport mechanism. Therefore, when the meal system 10 needs to be filled up or stored with new meal packages, the service provider is provided with information regarding particular meal packages to provide. The user may also provide input via the activity screens to modify and/or request particular types and/or quantities of food packages.

The freezer/refrigeration module 14 includes a compartment configured to store in a frozen and/or refrigerated state one or more meal packages. The compartment may be segmented into one or more sections, and each section may include plural shelves, cells, or holding units configured to receive a meal package. The sections may each be provided with a sensor, such as a thermistor or another temperature-sensing device, that is operably interconnected with the computer control interface to provide temperature feedback and enable the computer control interface to monitor and regulate the temperature of the various sections in the compartment using user defined or default temperature parameter inputs. Temperature measurements can be taken in real time or at intervals designated by the user. The sensor(s) can be operably interconnected with the computer control interface via a cable or interface connection that couples the sensor(s) to serial or other port(s) to accept an interface connection.

The freezer/refrigeration module 14 can interconnect to a power line to provide power to all components of the module. A back-up power source, such as a chargeable or non-chargeable battery, may be included to provide power in case of a main power loss or outage. An external LED or some other indicator may be provided on the freezer/refrigeration module to alert the user of a low battery condition.

The transport mechanism 16 includes a meal package transport assembly and a vertically movable guide rail. The transport assembly moves along the guide rail, and the guide rail adjustably moves to a position according to positional commands received from the computer control interface after receiving a selection order from a user. The transport assembly includes one or more controllable mechanical grasping devices to reach out and secure a meal package from a particular location. These grasping devices are operably interconnected with the computer control interface. The transport assembly and guide rail are operably interconnected via appropriate gearing and motors. The transport mechanism 16 can interconnect to a power line to provide power to all components of the mechanism 16.

The heating/cooking module 18 may be configured to heat items using microwave, infrared, convection, or any combination thereof. Cooking by microwave bombards food items with microwaves which excites water, fat, and sugar molecules of the food items contained in the food packages, thereby cooking both the outside and center of the food items at the same time. Cooking by infrared cooks food by emitting infrared frequencies and penetrating the food items. By penetrating the food items with infrared waves, the food items are cooked evenly inside and out, thereby sealing in juices and natural flavors. Convection cooking uses heated air that is blown in the heating/cooking module by fans located in the module. Microwave and convection cooking can be combined by heating using microwave and hot air simultaneously to achieve both a fast cooking time and browning effect of the food items. The heating/cooking module 18 can interconnect to a power line to provide power to all components of the module 18.

The delivery area 20 is configured as a presentable and clean area that may be attractive in appearance where a cooked meal package(s) may be retrieved by a user. The computer control interface 12, freezer/refrigeration module 14, food transport mechanism 16, heating/cooking module 18, and delivery area 20 are all made of appropriate durable material for their associated tasks. The delivery area may equipped with lights and can interconnect to a power line to provide power to all components of the delivery area 20.

Figure 3A:
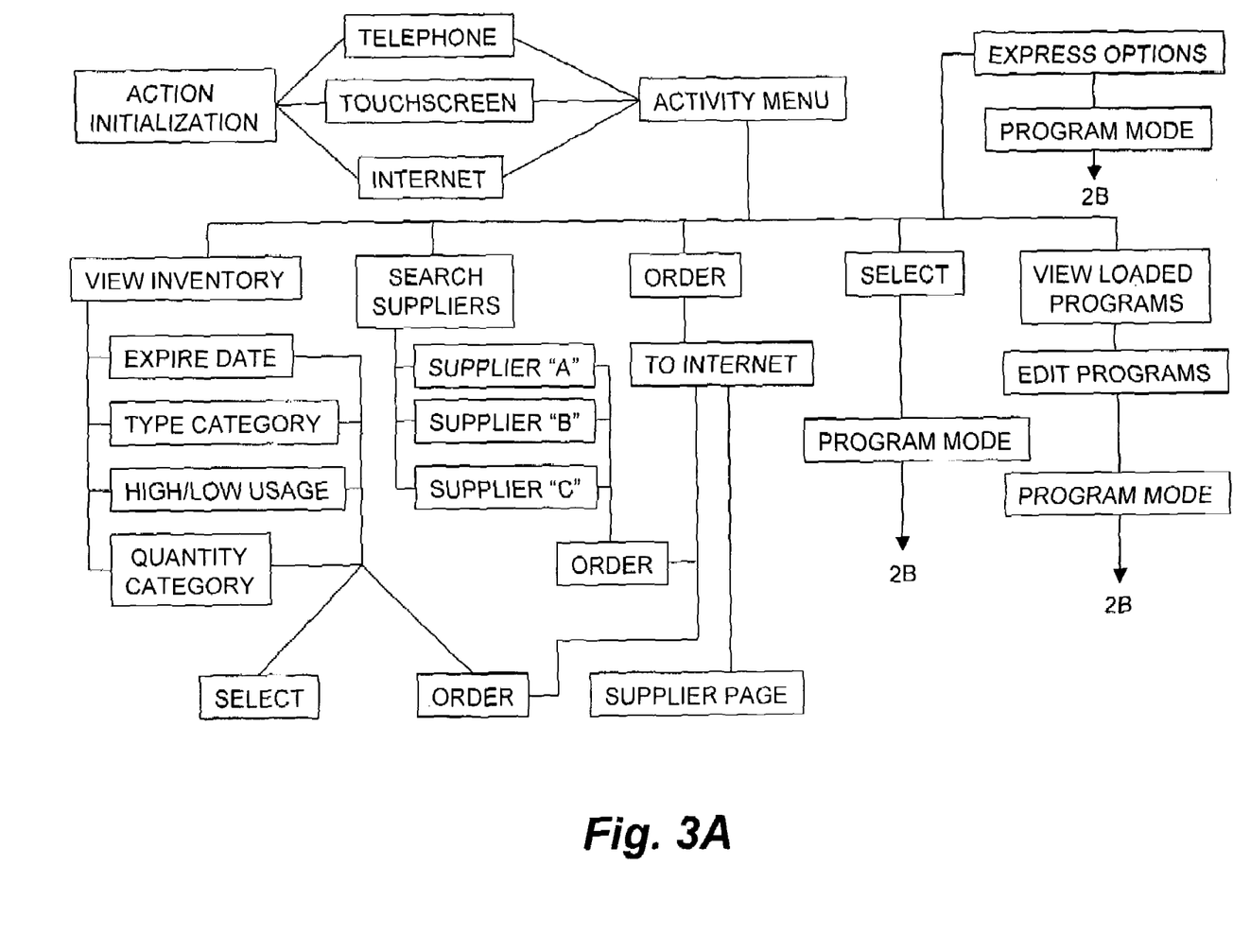
FIGS. 3A and 3B are functional diagrams of meal system software according to the present invention.
Figure 3B:
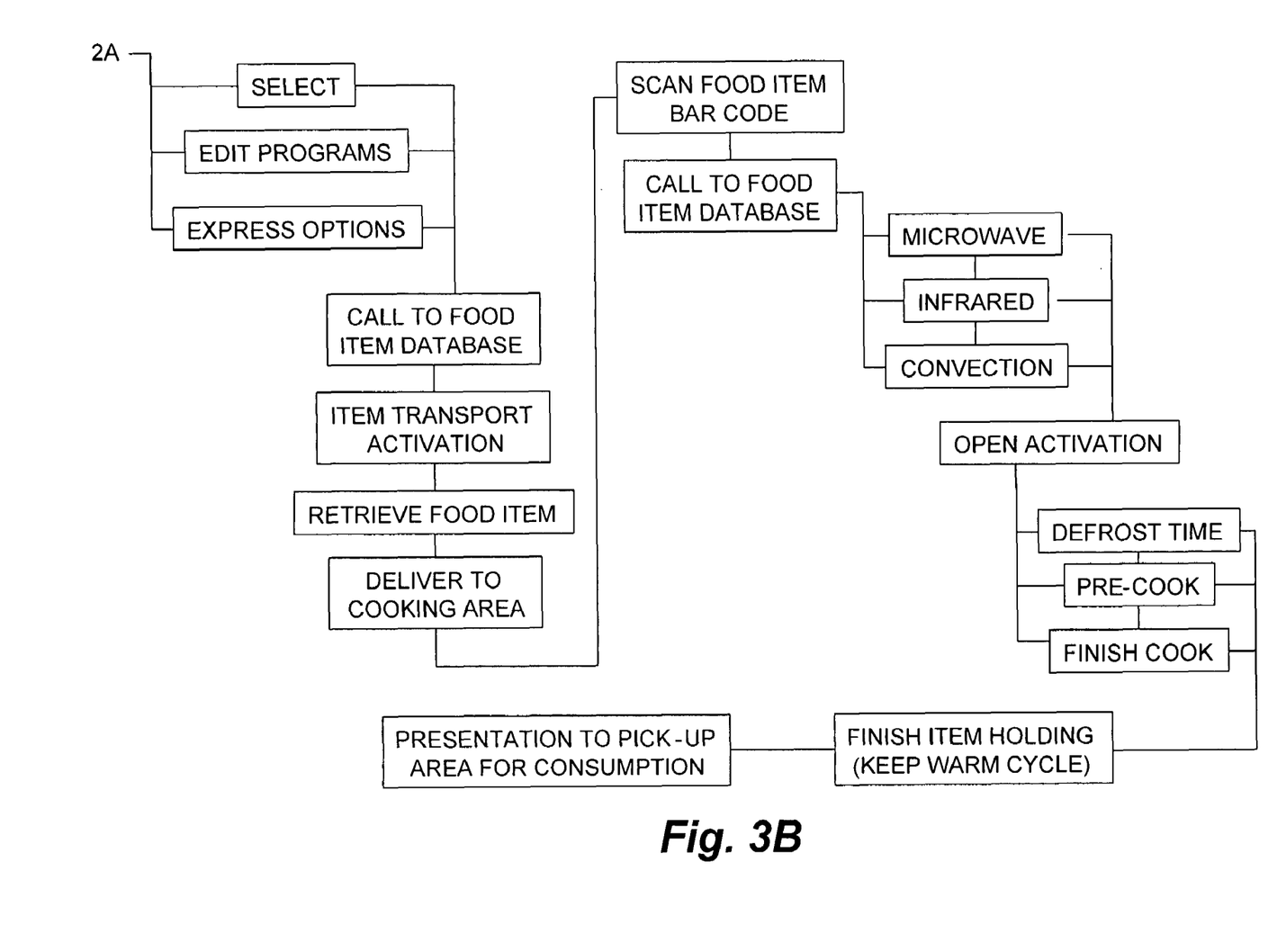

The meal system software includes code for accessing control database information that stores various parameters regarding the meal system 10. The parameters may include an inventory listing, cooking instructions, food packages that are available to feed predetermined numbers of people, the current quantity of particular food packages, expiration dates for particular food packages, the frequency of use of particular food packages, etc. The meal system software may suggest wines, alternate dishes, foods that need to be consumed before a set expiration date, a category listing for meats, fish, oriental, pasta, etc.

The user is able to select foods from an inventory menu and have the computer control interface 12 activate the cooking cycle at any time that user desires. The user activates the meal system 10 by remotely and/or physically engaging the computer control interface. Once activated, the user clicks a variety of screens and orders a particular meal package(s) for a predetermined number of people. After the particular meal package(s) are selected, the transport mechanism 16 retrieves the selected meal package(s) from the freezer/refrigeration module 14 and delivers the food package(s) to the heating/cooking module 18. The heating/cooking module 18 then heats the meal package(s) at predetermined temperature(s) or for a cycle of various predetermined temperature(s) for predetermined period(s) of time associated with the particular meal package.

Once the meal system 10 is activated, the user is presented with an activity menu. The activity menu provides the user with a variety of options, including view inventory, search suppliers, order, select, view loaded programs, and express options. The view inventory mode enables the user to view the system inventory (e.g., the available items currently contained within the storage unit) based on the expiration date, the type of item, the frequency of item usage, the item quantity, etc. The search suppliers mode enables the user to search, select, and/or order items from one or more suppliers. The order mode allows the user to order a particular meal package(s) from particular supplier(s). The select option mode enables the user to select a particular meal package(s). The view loaded programs mode enables the user to view and edit stored programs. Stored programs include code to query the freezer/refrigeration module about quantities of available food packages, to specify and/or alter operational parameters of the transport mechanism, to retrieve a food item, and to deliver a meal package(s) to the heating/cooking module. The stored programs also include code to scan meal package bar codes or the like, to retrieve cooking instructions from the meal system database.

The stored programs include cooking code with operational parameters to ensure the meal packages are cooked according to predetermined criteria via microwave, infrared, and/or convection. The operational parameters may include oven activation, defrost time, pre-cook time, temperature, the time to complete cooking, etc. The cooking code may also include cooling time and my provide a signal to indicate the meal package is ready to be retrieved by the user and consumed.

The meal system 10 may be used by any homeowner, small business, or other organization, such as small restaurants, hospitals, jails, nursing homes, etc. Users can select foods from a pre-defined menu of frozen and/or fresh refrigerated selections. Once a selection is made for a particular meal, the time of food delivery is programmed into the system. Access to the computer control interface 12 may be via telephone, the Internet, and direct operator pre-programming. The meal system 10 completely prepares and delivers pre-packaged foods as complete meals without any labor on the part of the operator or user. This provides extreme convenience for the user in terms of reduced shopping, elimination or preparation time and tracking of the aging of foods held in the meal system 10 in order to reduce the instance of waste/spoilage. The computer control interface 12 stores a software and includes a database that may suggest wines, alternate dishes, foods that need to be consumed before a set expiration date, a category listing for meats, fish, oriental, pasta, and other types of code.

The meal system 10 presents completely cooked food at the delivery area for the user to carry away. The meal system 10 provides savings to the consumer and business operator by reducing the time requirement for shopping for food items. As part of an attending service, food can be delivered on schedule or as a result of usage reported from the system to the food provider. The meal system reduces waste, and reduces preparation and planning time. Food can be ready to eat at an exact time of the day. This function can be programmed well in advance or at random. Cooking instructions are part of the control database and relieves the user of their need to program each item or meal. The meal system 10 maintains an inventory listing that includes information about the expiration date of stored foods and makes suggestions to use these foods before the expiration date.

The meal system 10 can prepare a meal for one person or several persons. The computer control interface 12 can determine what meals are available in inventory that can feed groups of people in number categories (e.g. what meals are available to serve four people, what meals pare available to serve six people, etc.). The computer control interface 12 remembers what meals are consumed more often or less often to assist in future adjustment of inventory procurement.

While the invention has been described with references to its preferred embodiments, it will be understood by those skilled in the art that various changes may be made and equivalents may be substituted for elements thereof without departing from the true spirit and scope of the invention.

We claim:

1. A meal system comprising:
   a computer control interface including a user-selectable menu of inventory;
   means for communicating with an external supplier of inventory, wherein said user-selectable menu of inventory categorizes said inventory by expiration date, categorizes said inventory by food classifications of individual inventory items and graphically presents said inventory by frequency of usage of individual inventory items and graphically presents said inventory by numeric quantity of individual inventory items;
   a freezer/refrigeration module;
   a food transport mechanism;
   a heating/cooking module; and,
   a delivery area, wherein said meal system is configured to provide food storage, preparation, and delivery in a finished cooked state, whereby a user selectively-orders new inventory from the external supplier via said user-selectable menu of inventory and said means for communicating with an external supplier of inventory.

2. The meal system according to claim 1, wherein said meal system is configured in the form of an independent unit.

3. The meal system according to claim 1, wherein said meal system is configured in the form of a combination of separate modules.

4. The meal system according to claim 1, wherein said computer control interface, freezer/refrigeration module, food transport mechanism, heating/cooking module, and delivery area are communicatively interconnected wirelessly.

5. The meal system according to claim 1, wherein said computer control interface, freezer/refrigeration module, food transport mechanism, heating/cooking module, and delivery area are communicatively interconnected non-wirelessly.

* * * * *